United States Patent
Palmer

[19]
[11] Patent Number: 5,996,331
[45] Date of Patent: Dec. 7, 1999

[54] PASSIVE TURBINE COOLANT REGULATOR RESPONSIVE TO ENGINE LOAD

[75] Inventor: Donald L. Palmer, Cave Creek, Ariz.

[73] Assignee: AlliedSignal Inc., Morris Township, N.J.

[21] Appl. No.: 08/931,403

[22] Filed: Sep. 15, 1997

[51] Int. Cl.[6] .............................. F02C 7/12; F01D 5/00
[52] U.S. Cl. ..................... 60/39.02; 60/39.07; 60/39.75; 415/115; 415/144
[58] Field of Search .............................. 60/39.02, 39.07, 60/39.75; 415/115, 117, 144, 145

[56] References Cited

U.S. PATENT DOCUMENTS

| | | |
|---|---|---|
| 2,598,176 | 2/1952 | Johnstone . |
| 3,366,315 | 1/1968 | Alberani ................................. 415/145 |
| 3,575,528 | 4/1971 | Beam, Jr. et al. ........................ 416/39 |
| 4,213,738 | 7/1980 | Williams . |
| 4,217,755 | 8/1980 | Williams . |
| 4,296,599 | 10/1981 | Adamson . |
| 4,329,114 | 5/1982 | Johnston et al. . |
| 4,332,133 | 6/1982 | Schwarz et al. . |
| 4,416,111 | 11/1983 | Lenahan et al. ........................ 415/115 |
| 4,650,397 | 3/1987 | Rogo ...................................... 415/115 |
| 4,708,588 | 11/1987 | Schwarz et al. . |
| 4,709,546 | 12/1987 | Weiler . |
| 5,048,288 | 9/1991 | Bessette et al. . |
| 5,311,734 | 5/1994 | Pope et al. ............................. 60/39.75 |
| 5,316,437 | 5/1994 | Czachor ................................. 415/115 |
| 5,358,374 | 10/1994 | Correia et al. . |
| 5,402,636 | 4/1995 | Mize et al. ............................. 60/39.75 |
| 5,555,721 | 9/1996 | Bourneuf et al. ...................... 60/39.75 |
| 5,575,616 | 11/1996 | Hagle et al. ............................ 415/115 |

*Primary Examiner*—Ted Kim
*Attorney, Agent, or Firm*—Robert Desmond, Esq.

[57] ABSTRACT

A passive feedback-controlled regulator and method for regulating gas turbine bleed air is provided, which automatically regulates the flow of coolant air directed to the turbine vanes, blades, and other hot section components based on the inherent differential pressure between the diffused compressor discharge pressure and the compressor impeller exit air. The differential pressure used to operate the regulator is a measure of the turbine mass flow rate, and, therefore is a measure of the instantaneous engine coolant flow requirement.

11 Claims, 3 Drawing Sheets

PASSIVE TURBINE COOLANT REGULATOR RESPONSIVE TO ENGINE LOAD

BACKGROUND OF THE INVENTION

This invention relates to gas turbine engine cooling systems.

In order to increase the efficiency and specific power output of gas turbine engines, these engines are designed to operate at ever increasing turbine inlet temperatures. To enable operation at such elevated temperatures, various engine components, such as the turbine nozzles and blades are cooled by a flow of coolant, typically high pressure bleed air from the turbine engine compressor. The high pressure air is diverted from the compressor discharge upstream of the burner and routed directly to the turbine blades and vanes, where it is discharged from openings in the turbine blades and nozzles to reduce the surface temperature of these components. However, coolant flow is a parasitic flow loss reducing engine efficiency.

At high power settings, such as during takeoff, the amount of cooling air that is required is relatively high. At lower power settings such as at cruise or idle, however, there is relatively little cooling air required. Nevertheless, conventional coolant flow systems are generally fixed in capacity to provide sufficient coolant flow to maintain the turbine blades and vanes below their design temperature when the turbine is operating at its maximum rated power. Accordingly, at reduced power settings, the flow of coolant is in excess of that necessary to maintain component temperature. This excess coolant flow results in engine efficiency below that which could be achieved if the bleed air were regulated to respond to the engine power requirements.

Regulation of coolant flow in response to engine operating conditions has been recognized as desirable. For example, U.S. Pat. No. 4,217,755 to Williams teaches a coolant flow valve in which a valve member regulates the flow of coolant in response to engine temperature. The opening and closing of the valve member is, however, controlled by an external controller, with commensurate complexity and reliability issues. U.S. Pat. No. 4,296,599 teaches a plurality of normally closed valves that open to permit a flow of coolant in response to an increase in the gross coolant air pressure or coolant air temperature. None of the prior art coolant systems, however, provide a simple passive feedback control of coolant flow that is responsive to engine coolant flow requirements.

SUMMARY OF THE INVENTION

The present invention comprises a simple passive feedback controlled regulator, which automatically regulates the flow of coolant air based on the inherent differential pressure between two different sources of cooling air, such as the diffused compressor discharge pressure and the compressor impeller exit air. This differential pressure is a measure of the turbine mass flow rate, and therefore, a regulator that is responsive to this differential pressure is, essentially responsive to the instantaneous engine coolant flow requirement. In an embodiment of the invention, the regulator comprises a valve seat operatively disposed in the flow of coolant air. A valve member moves in response to the differential pressure between the compressor discharge exit air and the compressor impeller exit air to throttle the compressor discharge exit air.

The present invention further comprises a method of regulating the flow of coolant air in a gas turbine engine in response to the turbine mass flow rate. In an embodiment of the method, the flow of coolant air is regulated by sensing a differential pressure between the diffused compressor discharge pressure and the compressor impeller exit air and regulating the flow of diffused compressor discharge air in response to this differential pressure.

BRIEF DESCRIPTION OF THE DRAWING

The invention will be better understood from a reading of the following detailed description taken in conjunction with the drawing figures in which like reference designators are used to designate like elements, and in which.

DETAILED DESCRIPTION

Figure 1:
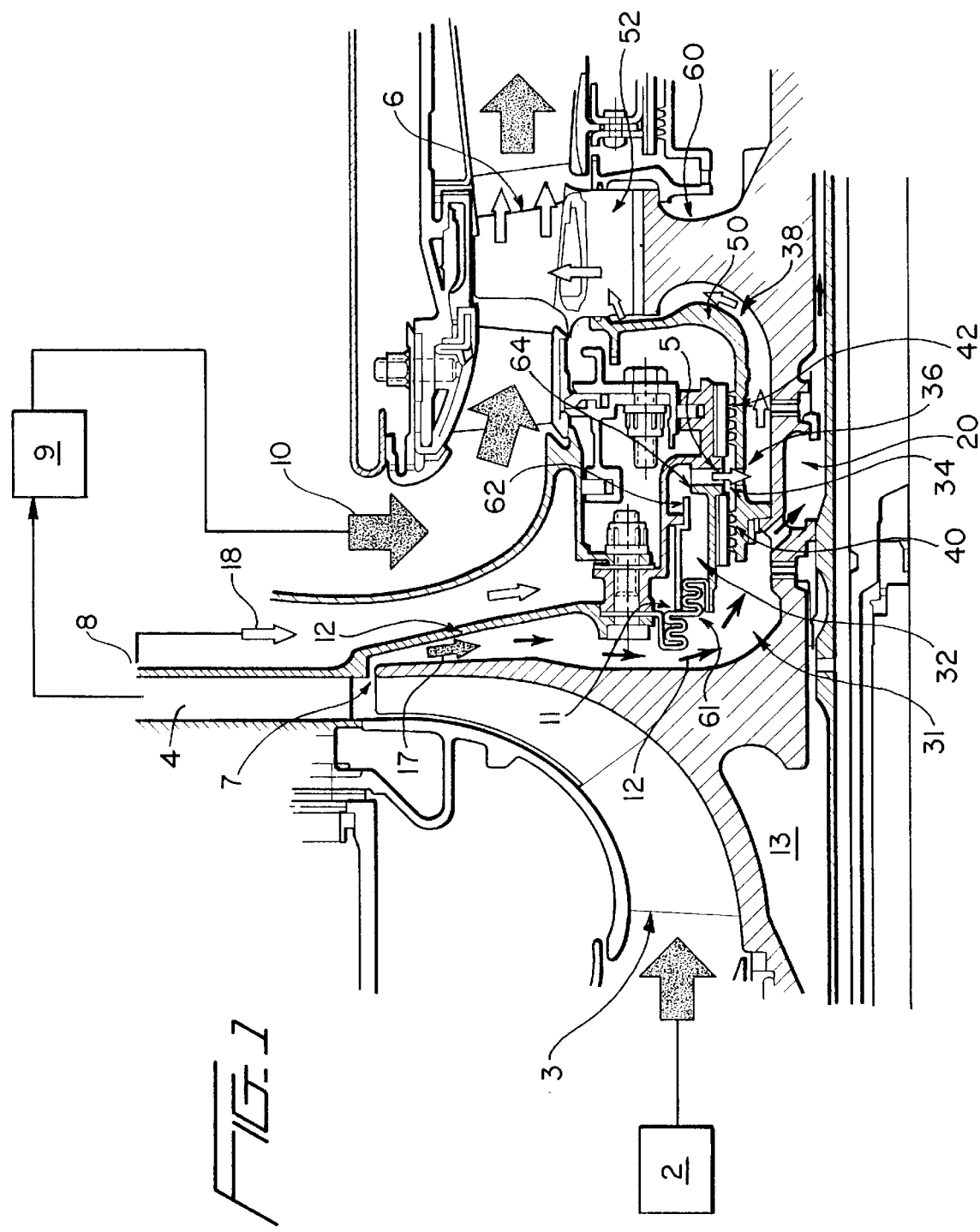
FIG. 1 is a generally axisymmetric cross sectional view of a portion of a gas turbine engine having a coolant flow regulator incorporating features of the present invention.

FIG. 1 depicts a portion of a turbine engine having disposed in serial flow relationship, an inlet 2, (shown schematically), a compressor section 13, a diffuser 4, a burner section 9 (also shown schematically), and a turbine section 6. Compressor section 13 includes an impeller 3. In normal operation, air enters the engine inlet 2 and is compressed by one or more compressor stages, (only one of which is shown in FIG. 1 as compressor section 13). Substantially all of the compressed air exits the compressor section 13 at the impeller exit 7 and enters the diffuser 4, where a portion of the velocity head is recovered as static pressure. The high pressure air exiting diffuser 4 enters burner 9, where it is mixed with fuel and burned. The high pressure, high temperature gas exits burner 9, enters turbine inlet 10 and flows past turbine 6, which extracts energy from the gas flow in a manner well known in the art.

A portion of the high pressure air exiting diffuser 4 is diverted via passage 8 past the burner section 9 for use as cooling air. This bleed air 18 from passage 8 enters a modified version of a conventional Tangential On Board Injector system (TOBI) indicated generally at 11. The modified TOBI 11 comprises a first chamber 32, a stationary passage 5 and an annular chamber 34 defined by rotating seals 40 and 42. Chamber 32 receives the flow of cooling air from the diffuser 8. Stationary passage 5 then conveys the flow of cooling air from first chamber 32 into annular chamber 34. A plurality of passages 36 in the wall of rotating seal member 50 admit air from annular chamber 34 into cooling passage 38, which rotates with turbine wheel 60. The cooling air 18 is then admitted from cooling passage 38 into plenum 52, which in turn, admits the air into passages internal to blade 6 for cooling the surface of blade 6.

As described hereinbefore, substantially all of the air discharged from compressor 3 enters the diffuser 4, however, a portion of the compressed air 17 is bled off at the compressor exit 7. This portion of the compressed air 17 is circulated around the housing 12 of the TOBI 11 through chamber 31 and into annular chamber 20 for use as additional coolant flow for the lower pressure stages of the power turbine and other components.

Attached to the housing 12 of the TOBI 11 is a diaphragm 61, which seals the flow of bleed air 18 inside the TOBI 11 from the portion of compressed air 17 outside the TOBI 11. Attached to diaphragm 61 is valve member 62. Valve member 62 is configured as a metering ring, which is moveable against a valve seat 64 to regulate the amount of air admitted through passage 5 for entry into the cooling passages of the turbine.

Figure 2:
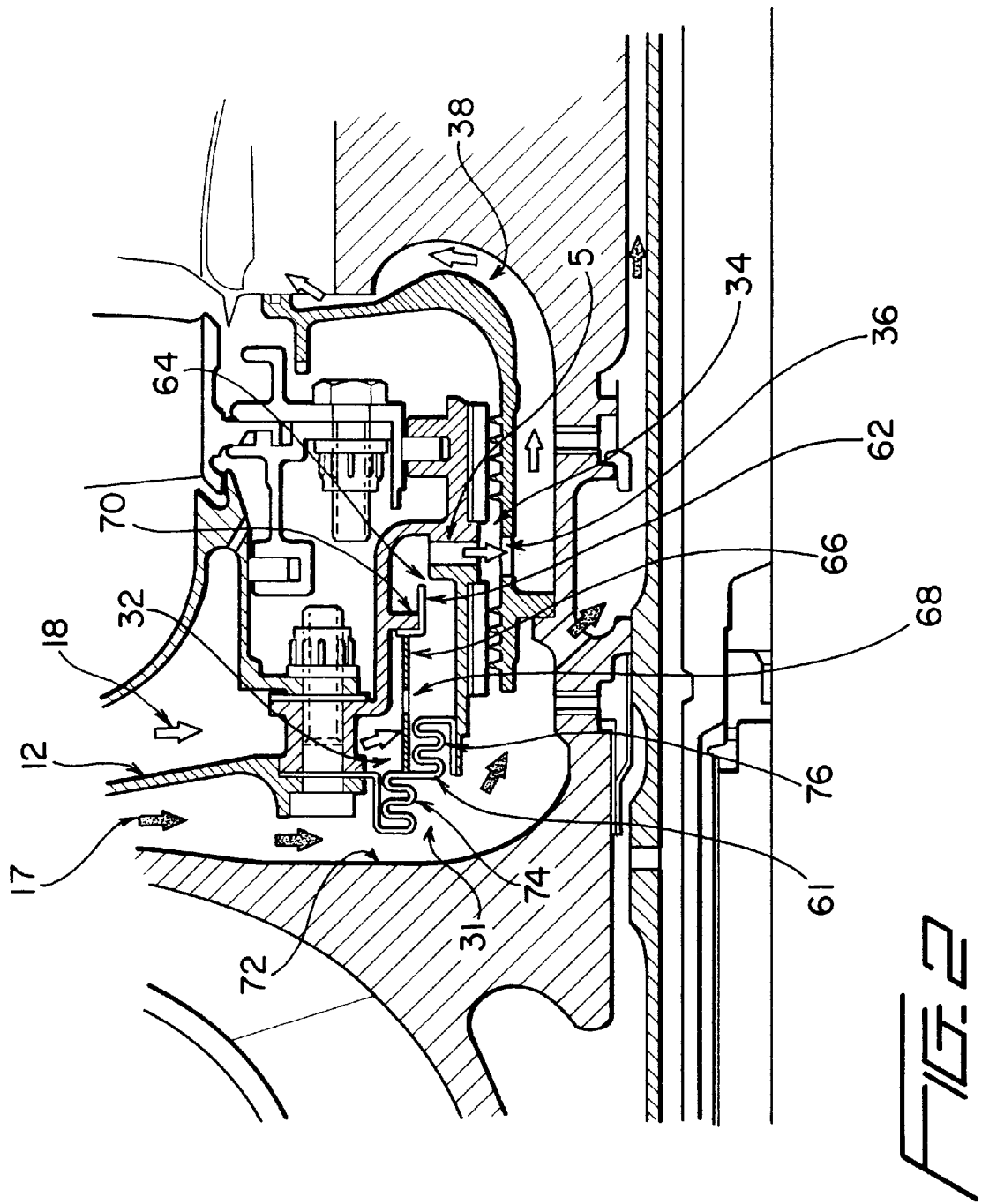
FIG. 2 is an enlarged view of a portion of FIG. 1.

As shown more clearly in FIG. 2, the flow of bleed air 18 enters chamber 32 inside TOBI 11, where it passes through the opening between the valve member 62 and valve seat 64 and then into passage 5 for conveyance to the turbine blades. In the exemplary embodiment of FIG. 2, valve member 62 is attached to diaphragm 61 by means of a cylindrical valve actuating member 66, having a plurality of passages 68 to permit unobstructed flow of cooling air 18 therethrough. Alternatively, valve actuating member 66 could comprise a plurality of actuator rods disposed between diaphragm 61 and valve member 62. A mechanical limit stop 70 prevents valve member 64 from completely closing off the flow of cooling air through passage 5 in the event of a failure of diaphragm 61.

In operation, the flow of air through passage 5 is regulated by the opening between valve member 62 and valve seat 64. The position of valve member 62 relative to valve seat 64 is, in turn, determined by the position of diaphragm 61. Diaphragm 61 moves in response to the difference in static pressure between the flow of bleed air 18 in chamber 32 and the portion of compressed air 17 in chamber 31. The differential pressure between chamber 32 and chamber 31, in turn, varies as a function of engine power setting. The pressure in chamber 31 resulting from the cooling flow 17 exiting the compressor at the impeller exit 7 is the result of the static pressure at the impeller exit 7, reduced by the pumping action of the back surface 72 of the impeller acting on the air in the chamber 31. The pressure in chamber 32 is the result of the static pressure at the exit of the diffuser 4 (FIG. 1). As the engine power setting is increased, the compressor impeller speed increases, resulting in a higher Mach number of the airflow at the impeller exit. The cooling flow 17 exiting the compressor at the impeller exit 7 does not pass through a diffuser. Accordingly, the static pressure in chamber 31 does not substantially increase with the increased velocity head. Contrastingly, the cooling flow 18 entering chamber 32 passes through diffuser 4, which diffuses a high percentage of the velocity head exiting the compressor to a much lower Mach number with a corresponding increase in static pressure. Accordingly, the difference in static pressure between chamber 31 and chamber 32 is proportional to turbine exit velocity, which is directly related to engine power setting.

As the static pressure in chamber 32 increases relative to the static pressure in chamber 31, diaphragm 61 is displaced toward chamber 31. As diaphragm 31 is displaced, valve member 62 is withdrawn from valve seat 64, increasing the flow of coolant air past valve seat 64 into the cooling passages for conveyance to the turbine blades 6. As the engine power setting is reduced, the compressor exit velocity decreases, which results in a decrease in the compressor exit velocity head and a corresponding decrease in the differential pressure between chamber 32 and chamber 31. As the pressure differential is reduced, the valve member 62 returns to valve seat 64, thereby reducing the flow of coolant air. Valve member 62 may have a variety of holes, slots, vees or other patterns formed in the edge in order to tailor the variation of coolant flow as a function of valve member displacement.

In the illustrative embodiment, the diaphragm 61 comprises a dual radius bellows having the valve actuating member 66 attached intermediate the inner and outer radius of the bellows. The dual radius bellows provides for axial movement of the valve actuating member with changes in differential pressure between chamber 32 and chamber 31. The intermediate attachment of valve actuating member 66 ensures that valve actuating member 66 will not move under the influence of changes in temperature, since thermal expansion of one fixed leg 74 of the diaphragm 61 will be countered by an equal expansion of the other fixed leg 76 of the diaphragm 61.

Figure 3:
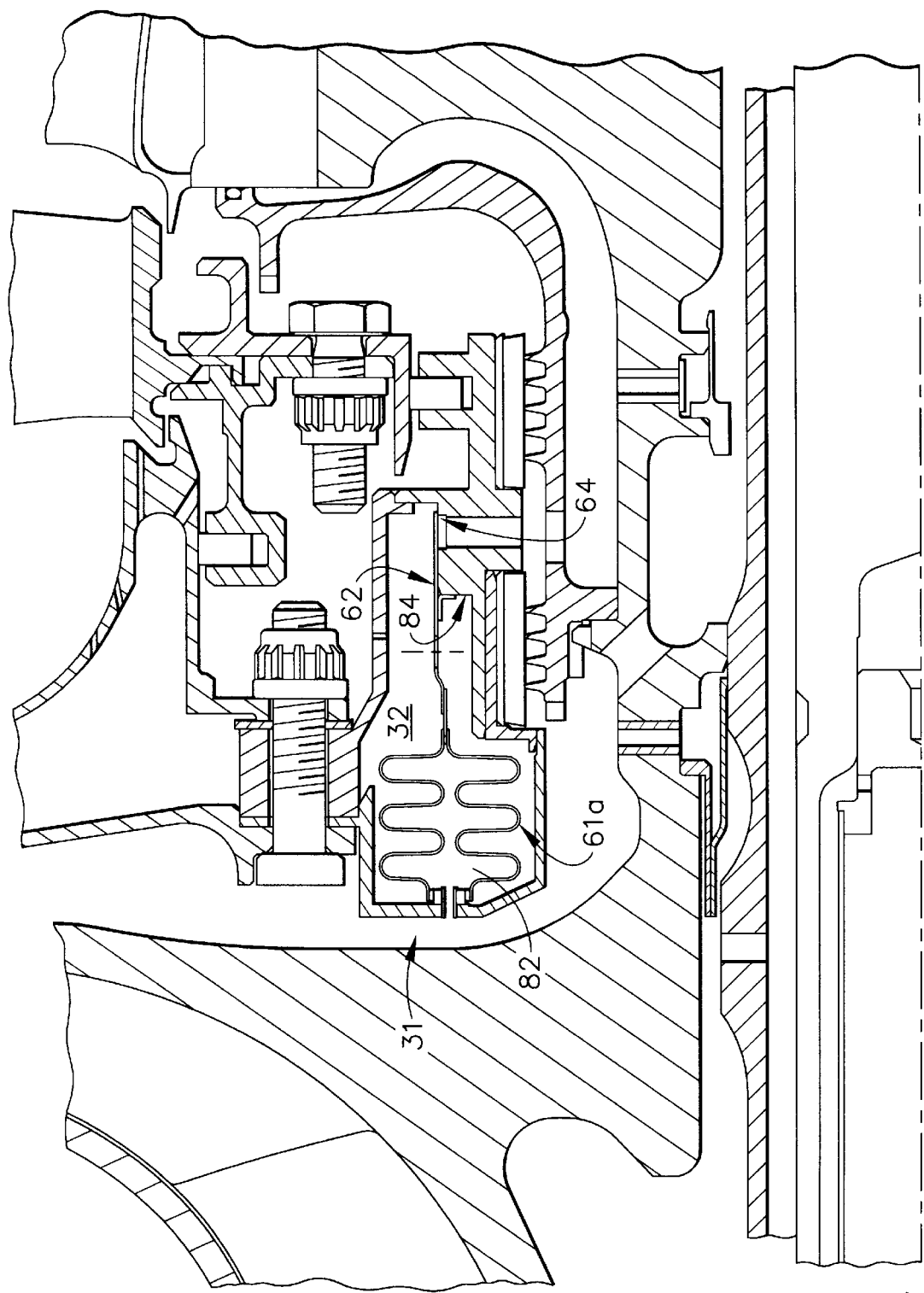
FIG. 3 is a cross sectional view of a turbine engine incorporating an alternative embodiment of a coolant flow regulator incorporating features of the present invention.

FIG. 3 illustrates an alternative embodiment in which valve member 62 comprises a solid cylindrical sleeve attached to diaphragm 61. Diaphragm 61-a comprises a pair of cylindrical, concentric bellows sealingly intersecured at one end to define a static pressure cavity 82 communicating with chamber 31 through an opposite open end. Diaphragm 61-a produces a spring-like biasing force urging valve member 62 toward the closed position illustrated. The location of housing segment 84 contacted by valve 62 determines the spring preload of diaphragm 61-a The spring rate and preload of diaphragm 61-a together define the minimum pressure differential required to open valve 62. Diaphragm 61-a provides greater area upon which the pressure differential operates and assures axially symmetric forces on the valve member 62.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. A turbine coolant flow control apparatus for use in a gas turbine engine having a coolant air bleed from a compressor section, said compressor section having a first and a second discharge path for providing coolant air, said first discharge path having a diffuser upstream of a burner section for recovering a greater degree of velocity head than said second discharge path, said coolant flow control assembly comprising:

a valve seat operatively disposed in said first discharge path;

a valve means for restricting a first flow through said valve seat, said valve means being directly responsive to a pressure differential between said first flow in said first discharge path and a second flow in said second discharge path, said pressure differential varying with changes in engine load.

2. The turbine coolant flow control apparatus of claim 1, wherein:

said first discharge path comprises a compressor discharge providing said first flow to a diffuser section in fluid communication with said burner section of said gas turbine engine.

3. The turbine coolant flow control apparatus of claim 1, wherein:

said second discharge path comprises a compressor impeller exit flow path.

4. The turbine coolant flow control apparatus of claim 1, said valve means further comprises:

a diaphragm, said diaphragm having first and second surfaces, said first surface being in fluid communication with said first discharge path and said second surface being in fluid communication with said second discharge path, said diaphragm operatively attached to a valve member for moving said valve member in response to said pressure differential.

5. The turbine coolant flow control apparatus of claim 4, wherein:

said diaphragm comprises a bellows having first and second edges fixed to a wall, said wall separating said first discharge path from said second discharge path, wherein said valve member is fixed to said diaphragm intermediate said first and second edges.

6. A cooling air delivery apparatus for a turbine engine comprising:

means for producing a flow of cooling air;

means for conducting said flow of cooling air to a component to be cooled, said means including a first cooling passage for conveying a first portion of said flow of cooling air and a second cooling passage for conveying a second portion of said flow of cooling air, diffuser means upstream of a burner section operatively disposed in said first cooling passage for recovering a portion of a velocity head of said first flow of cooling air whereby a pressure differential between said first portion of said flow of cooling air and said second portion of said flow of cooling air is created, said pressure differential directly varying with chances in engine load;

valve means operated directly by said pressure differential for regulating said flow of cooling air in said first cooling passage.

7. The cooling air delivery apparatus of claim 6, wherein:

said means for producing a flow of cooling air comprises a compressor section of said turbine engine.

8. The cooling air delivery apparatus of claim 6, further comprising:

a passage between said first cooling passage and said second cooling passage, wherein said valve means comprises a flexible diaphragm operatively attached to a valve member, said diaphragm being sealingly disposed in said passage for moving in response to said pressure differential.

9. A turbine engine having an improved cooling air delivery system comprising:

a compressor section for delivering a flow of cooling air;

means for conducting said flow of cooling air to a component to be cooled, said means including a first cooling passage for conveying a first portion of said flow of cooling air and a second cooling passage for conveying a second portion of said flow of cooling air, said first portion of said flow of cooling air flowing through a diffuser upstream of a burner section, said diffuser being adapted to recover a greater portion of velocity head from said first portion of said flow of cooling air than is recovered from said second portion of said flow of cooling air whereby a pressure differential is created between said first portion of said flow of cooling air and said second portion of said flow of cooling, said pressure differential directly varying with changes in engine load;

valve means operated directly by said differential pressure for regulating said flow of cooling air in said first cooling passage.

10. A method of regulating cooling air flow in a turbine engine comprising:

conveying a first portion of said cooling air flow to a first component to be cooled;

conveying a second portion of said cooling air flow to a second component to be cooled;

diffusing said first portion of said cooling air flow upstream of a burner section to recover a portion of a velocity head of said first portion of said cooling air flow to create a pressure differential between said first portion of said cooling air flow and said second portion of said cooling air flow, said pressure differential directly varying with changes in engine load; and moving a valve member in response to said pressure differential to regulate said first portion of said cooling air flow.

11. The method of claim 10, wherein:

said first portion of said cooling air flow comprises compressor discharge exit air and said second portion of said cooling air flow comprises compressor impeller exit air.

* * * * *